United States Patent
Williams et al.

(10) Patent No.: US 10,680,708 B2
(45) Date of Patent: Jun. 9, 2020

(54) SYSTEMS AND METHODS FOR LOCATING A SINGLE REFLECTION ON A TRANSMISSION LINE

(71) Applicant: CABLE TELEVISION LABORATORIES, INC, Louisville, CO (US)

(72) Inventors: Thomas H. Williams, Longmont, CO (US); Ryan Richard Vail, Loveland, CO (US)

(73) Assignee: Cable Television Laboratories, Inc, Louisville, CO (US)

( * ) Notice: Subject to any disclaimer, the term of this patent is extended or adjusted under 35 U.S.C. 154(b) by 156 days.

(21) Appl. No.: 15/481,135

(22) Filed: Apr. 6, 2017

(65) Prior Publication Data

US 2017/0294960 A1      Oct. 12, 2017

Related U.S. Application Data

(60) Provisional application No. 62/318,871, filed on Apr. 6, 2016, provisional application No. 62/327,199, filed on Apr. 25, 2016.

(51) Int. Cl.
| | | |
|---|---|---|
| *H04B 10/071* | (2013.01) | |
| *H04B 10/25* | (2013.01) | |
| *H04B 3/48* | (2015.01) | |
| *H04B 10/077* | (2013.01) | |

(52) U.S. Cl.
CPC ............ *H04B 10/071* (2013.01); *H04B 3/48* (2013.01); *H04B 10/0775* (2013.01); *H04B 10/2503* (2013.01)

(58) Field of Classification Search
CPC .... H04B 10/071; H04B 3/48; H04B 10/2503; H04B 10/0775
USPC .................................................. 324/637–647
See application file for complete search history.

(56) References Cited

U.S. PATENT DOCUMENTS

| | | |
|---|---|---|
| 5,504,832 A | 4/1996 | Taguchi |
| 5,652,522 A | 7/1997 | Kates et al. |
| 6,509,740 B1 * | 1/2003 | Needle .................. G01R 31/11 324/533 |
| 7,212,008 B1 | 5/2007 | Barsumian et al. |
| 7,583,074 B1 | 9/2009 | Lynch et al. |

(Continued)

*Primary Examiner* — Jeff W Natalini
(74) *Attorney, Agent, or Firm* — Armstrong Teasdale LLP

(57) ABSTRACT

A system for testing reflections within a data transmission signal includes a data transmission line configured to transmit the signal in a downstream direction, and a test probe configured to electrically contact a contact point on the transmission line and measure a magnitude of a frequency response of the signal therein. The system further includes a spectrum capturing device in operable contact with the test probe, and configured to collect and arrange data of frequency response magnitudes measured by the test probe. The data transmission line includes at least a first impedance mismatch corresponding to a first reflection point along the transmission line, and the spectrum capturing device is configured to determine a severity of the first reflection based on a comparison of a first voltage $V_1$ with a second voltage $V_2$, where $V_1$ represents a DC term, and where $V_2$ represents a reflected energy of a subsequent impulse.

12 Claims, 6 Drawing Sheets

(56) References Cited

U.S. PATENT DOCUMENTS

| | | | |
|---|---|---|---|
| 8,917,097 B2* | 12/2014 | Landes | G01R 31/008 |
| | | | 324/533 |
| 2005/0089334 A1* | 4/2005 | Regev | H04B 10/40 |
| | | | 398/139 |
| 2005/0190104 A1* | 9/2005 | Coleman | H01Q 3/267 |
| | | | 342/368 |
| 2007/0121267 A1* | 5/2007 | Kotani | H01J 37/32174 |
| | | | 361/85 |
| 2007/0152601 A1 | 7/2007 | Nerone | |
| 2010/0244859 A1 | 9/2010 | Cormier, Jr. et al. | |
| 2010/0318026 A1 | 12/2010 | Grunwald | |
| 2017/0141845 A1* | 5/2017 | Totten | H04N 21/6118 |

* cited by examiner

SYSTEMS AND METHODS FOR LOCATING A SINGLE REFLECTION ON A TRANSMISSION LINE

CROSS REFERENCE TO RELATED APPLICATIONS

This application claims the benefit of and priority to U.S. Provisional Patent Application Ser. No. 62/318,871, filed Apr. 6, 2016, and to U.S. Provisional Patent Application Ser. No. 62/327,199, filed Apr. 25, 2016, the disclosures of which are herein incorporated by reference in their entirety.

BACKGROUND

The field of the disclosure relates generally to data transmission systems, and more particularly, to data transmission systems utilizing defect testing on in-service data transmission lines.

In conventional data transmission systems, two impedance mismatches can create an echo tunnel on a transmission line, such as a cable line. A receiver of the conventional system will then observe a resulting ripple in the frequency response from the transmission line, as well as a second impulse in the time domain response, which is normally delayed relative to a main impulse. However, when only one reflection is present, a resulting frequency response will be flat at the receiver (i.e., not attenuated), but have a relatively lower amplitude due to signal loss. It is therefore difficult, in conventional data transmission systems, to discover line defects, such as loose fittings and radial cracks, where an echo tunnel is not formed because only one impedance mismatch is encountered. This problem is rendered more difficult due to the fact that time domain reflectometers (TDR) cannot be used on in-service cable plant.

Accordingly, there is a need to be able to locate line defects on an in-service data transmission line when only one impedance mismatch is observed.

BRIEF SUMMARY

In an embodiment, a system for testing reflections within a data transmission signal, includes a data transmission line configured to transmit the data transmission signal in a downstream direction, and a test probe configured to electrically contact a contact point on the data transmission line, and to measure a magnitude of a frequency response of the data transmission signal from the data transmission line. The system further includes a spectrum capturing device in operable contact with the test probe, and configured to collect and arrange data of frequency response magnitudes measured by the test probe. The data transmission line includes at least a first impedance mismatch corresponding to a first reflection point along the transmission line, and the spectrum capturing device is configured to determine a severity of the first reflection based on a comparison of a first voltage V1 with a second voltage V2. V1 represents a DC term created by a main impulse, and V2 represents a reflected energy of a subsequent impulse.

In an embodiment, a method of calculating an impulse response based on a magnitude-only frequency response is provided. The method includes steps of capturing spectral data of a downstream digital signal, averaging the captured spectral data and comparing the average with unimpaired captured spectral data to correct for potential discrepancies, and to produce a corrected magnitude-only frequency response, performing an inverse Fourier transform on the corrected magnitude-only frequency response to create a time domain response, and removing comb teeth from the created time domain response, by cancelation, to render the impulse response observable in the time domain response.

In an embodiment, a method for measuring impedance mismatches within a data transmission system is provided. The data transmission system includes a data transmission line and a test probe. The method includes steps of applying the test probe to the data transmission line, capturing wideband, averaged, spectral information on noise-like digital signals traveling over the data transmission line, performing an inverse transform on the captured spectral information to produce temporal data, and measuring a time delay associated with a ripple in a spectral response of the captured spectral information. The step of performing an inverse transform utilizes magnitude values of the captured spectral information and one or more zero values for associated respective phases.

In an embodiment, a method for measuring a length of an echo tunnel proximate a termination of a data transmission system is provided. The data transmission system includes a data transmission line. The method includes steps of capturing wideband, averaged, spectral information on noise-like digital signals traveling over the data transmission line, performing an inverse transform on the captured spectral information to produce temporal data, and measuring a time delay associated with a ripple in a spectral response of the captured spectral information. The step of performing an inverse transform utilizes magnitude values of the captured spectral information and a zero value for the phase.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Figure 1:
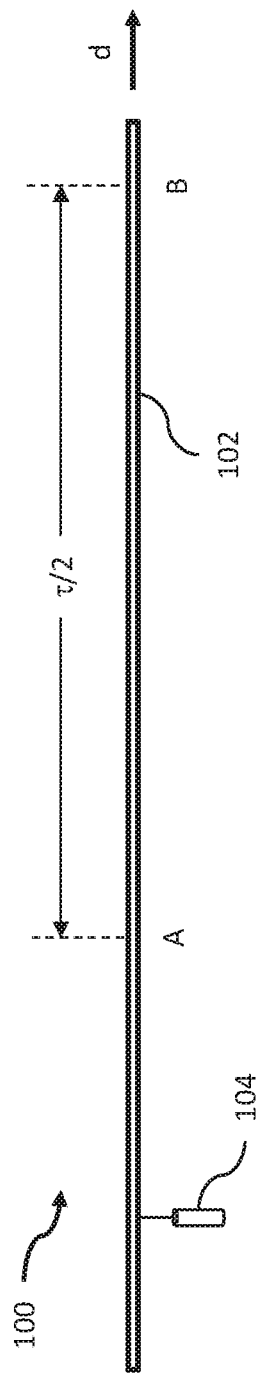
FIG. 1 is a schematic illustration depicting an exemplary data transmission system, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

In an exemplary embodiment, a high impedance probe (connected to a spectrum analyzer or data acquisition device, such as a software defined radio (SDR), or analog-to-digital converter (ADC) whose captured data is Fourier transformed) is brought into contact with an operational transmission line to observe a standing wave with a single reflection. The standing wave results from linear addition and subtraction of signals at different frequencies, caused by two signals traveling in opposite directions along the transmission line. The high impedance probe thus samples the standing wave without affecting the wave. In one example, the signals are cable signals, and are assumed to exhibit a relatively flat energy-versus-frequency ratio. With a further assumption that imaginary values for such a cable signal are all zero, and real values are all magnitudes measured by the probe, the signal can then be transformed (e.g. by an inverse Fourier transform) into the time domain. That is, complex data points are not captured, just magnitude values. This time domain data, which may be obtained from an inverse Fourier transform of the spectral magnitude data, and obtained utilizing the high-impedance probe, may then be advantageously utilized to locate single reflections on an in-service transmission line/cable plant from the time delay, from which distance can be calculated knowing the velocity of propagation inside the cable.

FIG. 1 is a schematic illustration depicting an exemplary data transmission system 100, according to an embodiment. System 100 includes a test probe 102 for measuring a data transmission line 104 at a contact location 106. In an exemplary embodiment, test probe 102 is a high impedance probe to limit mismatch, and data transmission line 104 represents an in-service cable plant transporting live data signals. In one example, test probe 102 is configured to electrically contact a seizure screw of a tap (not shown) in the data transmission line 104 while data transmission line is in-service, through a KS port on a tap (see FIG. 5, not shown in FIG. 1) and provide a 75 ohm output signal attenuated by some fixed value, such as 20 or 30 decibels (dB).

In a preliminary exemplary operation, test probe 102 contacts data transmission line 104, which exhibits a single reflection from a nearby first reflection point A, and from a distant second reflection point B which represent respective impedance matches. In some embodiments, data transmission line 104 is a coaxial cable, and test probe 102 physically contacts a center conductor (not shown) of the coaxial cable. In alternative embodiments, where data transmission line 104 is not a coaxial cable, test probe 102 may operate according to waveguide or parallel conductor principles. In this example, it is presumed that a direction of travel d for a downstream signal is known, and thus it is understood that the single reflection emanates from the left (as illustrated) and travels in downstream direction d.

In an alternative operation of system 100, reflections occur at both first reflection point A and second reflection point B, forming an echo tunnel therebetween, where a test point, such as an end point in a home (not illustrated) terminates data transmission line 104 outside the echo tunnel. In this example, an echo occurring within the echo tunnel would die out after multiple transits between the two points (A and B) impedance matching. A time constant $\tau$ characterizes the frequency response of system 100, and represents the elapsed system response time for a full transit from point A to point B and back again, and therefore the response time from only one point to the other has a value of $\tau/2$.

Figure 2:
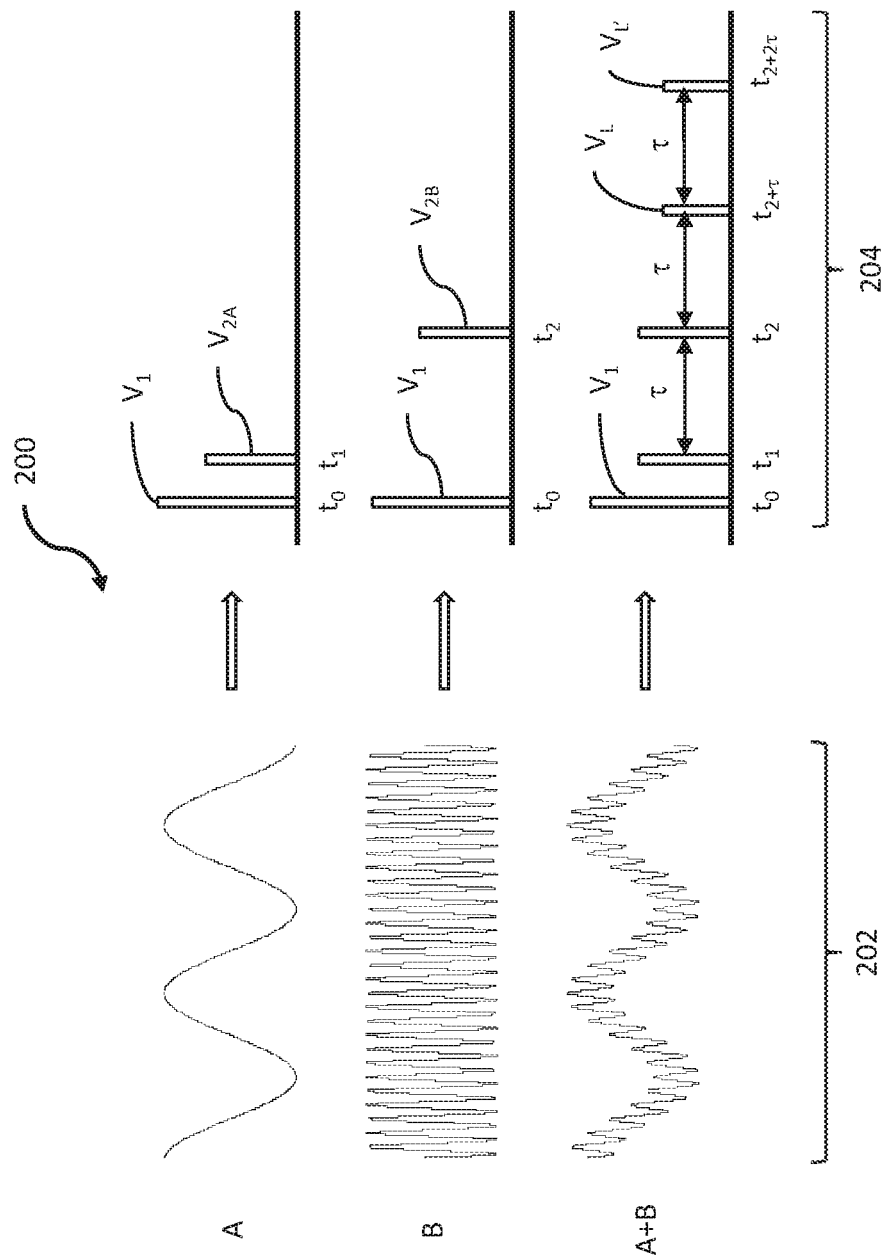
FIG. 2 is a graphical illustration of the frequency response and the time domain response of the data transmission system depicted in FIG. 1.

FIG. 2 is a graphical illustration 200 of exemplary frequency responses 202 and corresponding exemplary time domain responses 204 of data transmission system 100, FIG. 1. Time domain responses 204 may result, for example, from application of an inverse fast Fourier transform (IFFT) 206 on respective ones of the frequency responses 202. In the example depicted in FIG. 2, frequency response 202(a) and associated time domain response 204(a) are both illustrated in the case of a single reflection from first reflection point A (e.g., a short reflection); responses 202(b) and 204(b) are both illustrated in the case of a single reflection from second reflection point B (e.g., a long reflection); and responses 202(c) and 204(c) are both illustrated in the case of an echo tunnel formed between points A and B, where test probe 102 is upstream of the echo tunnel formed between points A and B, as depicted in FIG. 1. Responses 202 and 204 are depicted for illustrative purposes, and are not intended to reflect an exact scale.

In the exemplary embodiment depicted in illustration 200, the severity of each measured reflection can be determined according to the formula $20*\log(V1/V2)$, where V1 is a direct current (DC) voltage term representing the main impulse forward signal traveling to the right, and V2 represents the energy of the reflected signal traveling to the left. In some embodiments, the impedance mismatch severity is more accurately measured by factoring in cable attenuation, which increases both with increasing distance and frequency. In this example, decreasing energy is represented by measurements $V_L$, $V_{L'}$ at times $t_{2+\tau}$, $t_{2+}2\tau$, respectively.

Figure 3:
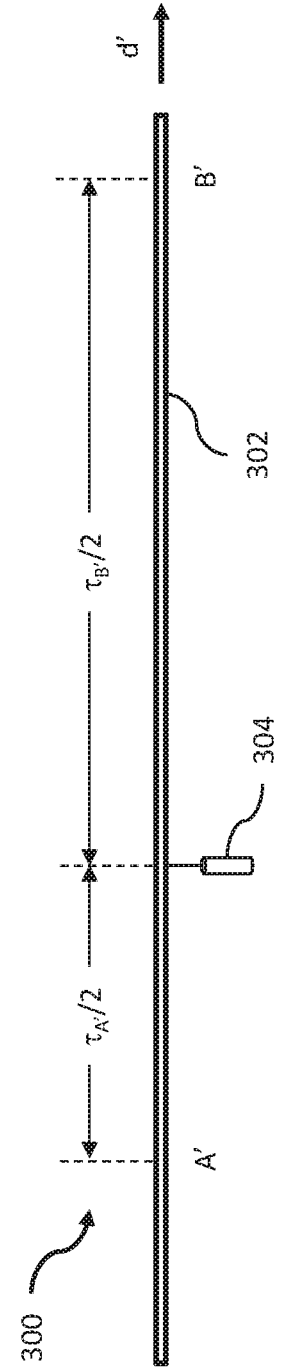
FIG. 3 is a schematic illustration depicting an exemplary data transmission system, according to an alternative embodiment.

FIG. 3 is a schematic illustration depicting an exemplary data transmission system 300, according to an alternative embodiment. System 300 includes a test probe 302 for measuring an in-service data transmission line 304 having a direction of downstream signal travel d', and an echo tunnel formed between a first reflection point A' and a second reflection point B'. System 300 is similar to system 100 except that test probe 302 contacts data transmission line 304 inside of the portion of the data transmission line containing the echo tunnel.

In exemplary operation, because test probe 302 is downstream first reflection point A', but upstream second reflection point B', the reflection from second reflection point B' (e.g., having a time constant $\tau_B/2$) is observable test probe 302, whereas the direct reflection from first reflection point A' is not. However, the indirect reflection from first reflection point A' can be observed by test probe 302 after the indirect reflection echoes from second reflection point B' and then reverses direction from downstream to upstream. As described above, this echo dies out after multiple transits between the two impedance mismatches (e.g., represented by points A' and B'), as explained further below with respect to FIG. 4.

Figure 4:
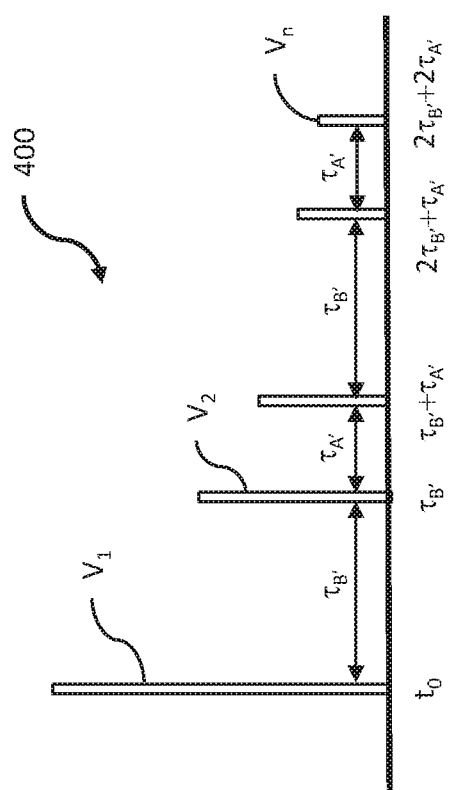
FIG. 4 is a graphical illustration of the time domain response of the data transmission system depicted in FIG. 3.

FIG. 4 is a graphical illustration of a time domain response 400 of data transmission system 300, FIG. 3. In the exemplary embodiment, time domain response 400 includes a plurality of energy recursions $V_{1-n}$ that diminish over time, where the energy determinations are made at combined multiples of $\tau_B$, and $\tau_A$, (e.g., $\tau_{B'}$, $\tau_{B'}+\tau_{A'}$, $2\tau_{B'}+\tau_{A'}$, $2\tau_{B'}+2\tau_{A'}$). In this example, multiple recursions thus indicate the presence of an echo tunnel, whereas a single substantially measurable recursion in time domain response 400 would indicate a single reflection only. Accordingly, location of a test probe outside of an echo tunnel renders the observation of the echo tunnel easier. Generally, the output of a downstream RF amplifier serves as a sufficient location for a bidirectional probe because all relevant reflections will be downstream. That is, downstream amplifiers amplify signals traveling in the downstream direction.

Figure 5:
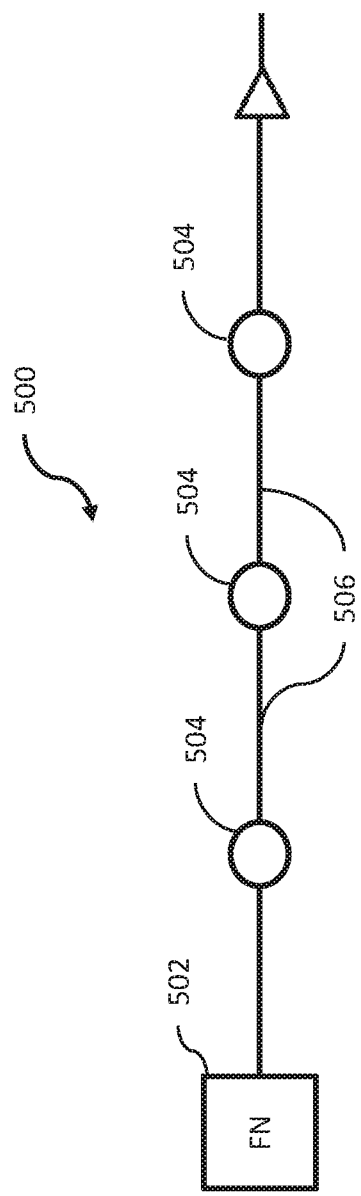
FIG. 5 is a schematic illustration depicting an alternative data transmission system.

FIG. 5 is a schematic illustration depicting an alternative data transmission system 500. System 500 includes a fiber node 502 and a plurality of cascading taps 504 located along a data transmission line 506. System 500 may be, for example, similar to either or both of system 100, FIG. 1, and system 300, FIG. 3. In an exemplary embodiment, data transmission line 506 is a hard line coaxial cable. In some embodiments, fiber node 502 functions as a test point utilizing a directional coupler. In exemplary operation, a bi-directional signal (not shown) may be probed (e.g., by a test probe, as described above) at an input or output of one or more of taps 504.

Figure 6:
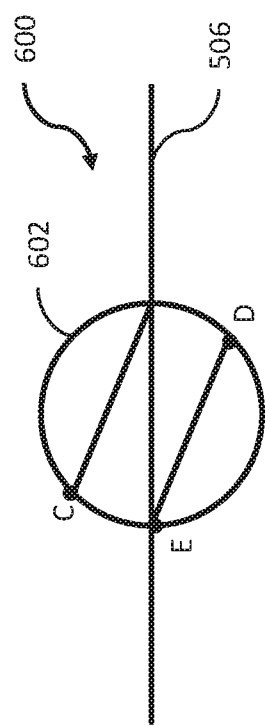
FIG. 6 is a schematic illustration of an alternative tap that can be implemented on the data transmission line depicted in FIG. 5.

FIG. 6 is a schematic illustration of an alternative tap 600 that can be implemented on data transmission line 506, FIG. 5. Tap 600 is similar to tap 504, FIG. 5, except that tap 600 utilizes a tap plate 602 that functions as a bi-directional directional coupler. Tap plate 602 includes an upstream test point C, a downstream test point D, and a bidirectional test point E. Tap 600 thus functions as an alternative system to distinguish downstream signals from upstream signals by functionally implementing two directional couplers in series; with one tap port (D) sampling downstream signals, and the other tap port (C) sampling upstream signals. In other words, an unimpaired signal can be measured at a noted test point (e.g., fiber node 502, FIG. 5) or point D, an upstream signal can be measured at point C, and bidirectional signals can be measured at point E.

In some embodiments, tap plate 602 temporarily replaces a regular tap plate (e.g., tap 504, FIG. 5), which typically has customers connected, without disrupting signals transmitted along data transmission line 506. In one example, tap plate 602 has a value of 12 dB. In an exemplary embodiment of tap 600, a distance to a single reflection (not illustrated in FIG. 6) may be determined utilizing a wideband signal capture at points D and C (e.g., by a two-channel digital oscilloscope), and then determining a complex cross-correlation to provide the corresponding time delay of the reflection.

Figure 7:
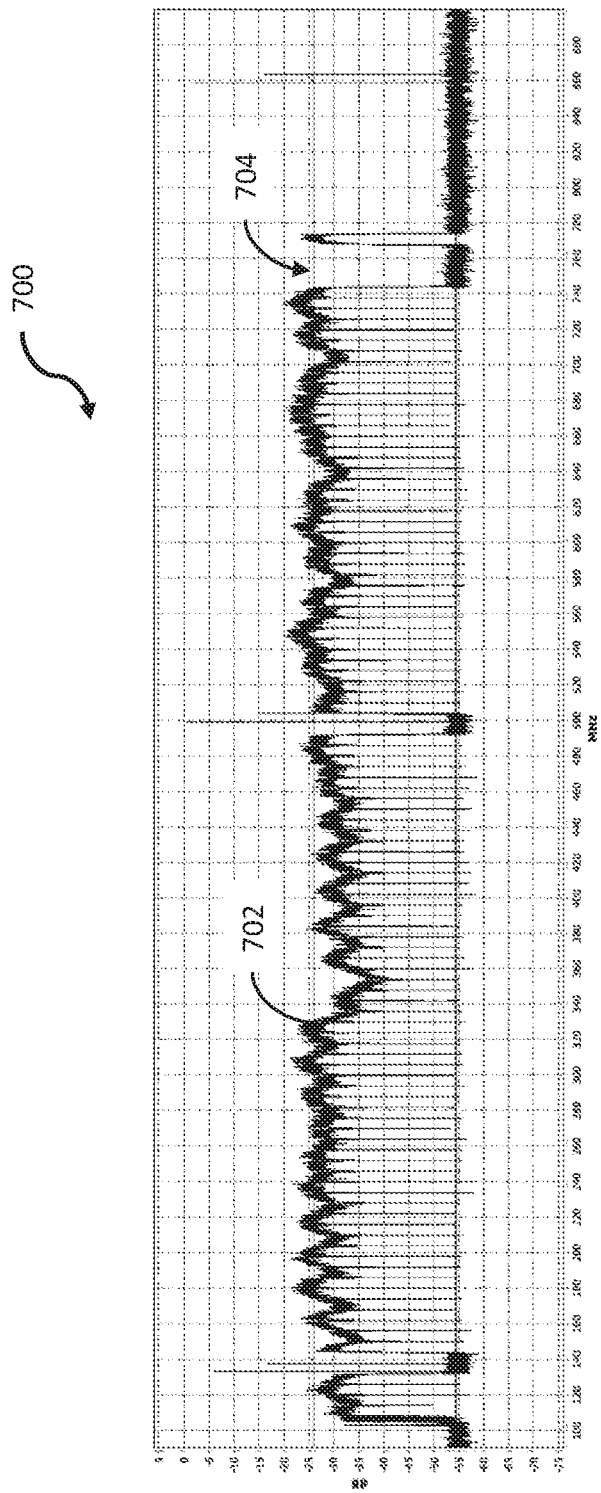
FIG. 7 is a graphical illustration of a magnitude plot of captured spectral data.

FIG. 7 is a graphical illustration of a magnitude plot 700 (in dB) over frequency (in megahertz (MHz)) of captured spectral data 702 of a downstream digital signal, as described above. Magnitude plot 700 may, for example, include at least one vacant band 704. In an exemplary embodiment, plot 700 is utilized to calculate an impulse response from the magnitude-only frequency response. Ripples in spectral data 702 of plot 700 indicate the existence of an echo tunnel (e.g., as if the data were captured in a home environment), however, no phase data is available from the magnitude only frequency response information. The magnitude spectral data may be captured, for example, by a software-defined radio (SDR) or by a conventional spectrum analyzer. In order to perform an IFFT to convert spectral data into time data, a (false) phase value of zero may be used to allow the transform to be successfully performed. It may be noted that, utilization of this false phase value implicitly assumes that some other linear distortions, such as group delay, will not be visible. However, the ripples in the frequency domain indicate the distances to the impedance mismatches, with significant accuracy, for a wide capture of spectral data 702. In some embodiments, an average of many spectral traces is transformed so that the resulting time response will contain less random noise.

In an exemplary embodiment, the undistorted digital signal may be captured at the fiber node (e.g. fiber node 502, FIG. 5), which may function as a downstream launch point. Alternatively, the digital signal may be captured from a tap port (e.g., tap 504, FIG. 5), including a tap where a KS port seizure screw is probed. In this example, a seizure screw may be configured to observe the combined signals in both the upstream and downstream directions, whereas a conventional tap port will typically only observe downstream signals. In some embodiments, a high impedance probe (test probe 102, FIG. 1) electrically contacts the seizure screw on the tap, and the ripple effect in the frequency response can then be measured and plotted. In such circumstances, frequency response may be measured from the tap input (or output) to the probe output, with a single back-echo creating the standing wave. As described above, ripples observed in a home indicate the presence of an echo tunnel; a single reflection typically will not be observable in a home terminal.

In at least one embodiment, the standing wave may be detected by first highly-averaging the spectral measurement of the unimpaired spectrum signal, and then using the unimpaired spectrum to correct for the highly-averaged received bidirectional signal through frequency domain division. It should be noted here that frequency domain division is not typically complex, that is, real-only, since phase is not known. In some embodiments, subtracting dB values will functionally achieve substantially the same calibration result. These calibration/normalization processes serve to remove the teeth (harmonics) on the comb that are depicted in FIG. 8.

In an additional or alternative embodiment, a length of an echo tunnel, caused by impairments on a transmission line, can be determined by performing an inverse Fourier transform, or an IFFT, on the magnitude-only frequency response of plot 700. In this embodiment, the phase of the response is presumed (falsely) to be zero, and the transform may be performed on the frequency response without having to provide any frequency domain imaginary data. In other words, a time domain response can be determined from the IFFT even when phase data is not available.

In some embodiments, a CPE Spectrum Capture (sometimes referred to as Full Band Capture (FBC) is utilized by cable modems and set-top boxes to provide magnitude-only spectral data about RF path conditions in a remote location, such as a home. In some such instances, the downstream channels being monitored are digital channels using, for example, 64-QAM or 256-QAM. In other instances, the monitored signals are analog signals, or noise and ingress.

Figure 8:
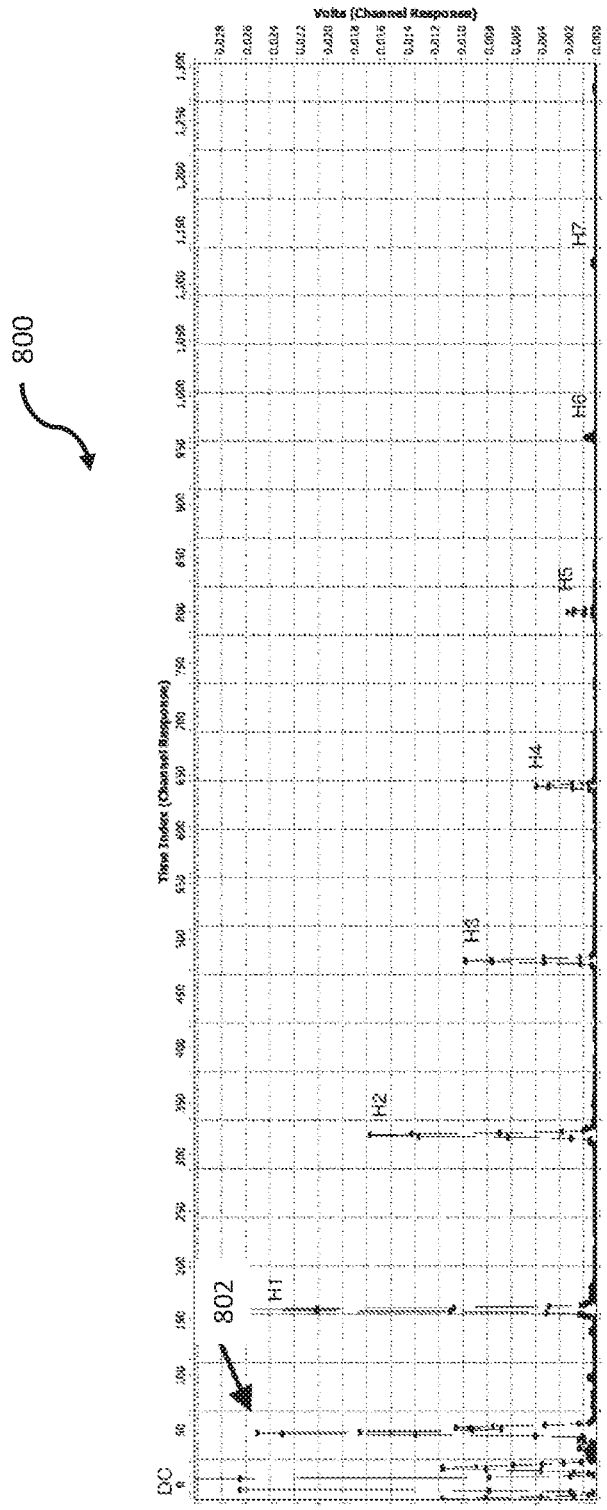
FIG. 8 is a graphical illustration of a time domain response of the magnitude plot depicted in FIG. 7.

FIG. 8 is a graphical illustration of a time domain response 800 of magnitude plot 700, FIG. 7. Time domain response 800 includes an impulse 802 and a plurality of peaks H1-H7. In the exemplary embodiment, time domain response 800 is created by performing an IFFT on plot 700, FIG. 7, and impulse 802 is caused by the ripple effect (wave) in the captured spectral data 702 frequency response, peaks H1-H7 are caused by spectral notches between QAM carriers. Although blocks of QAM signals are utilized in the example response 800 illustrated in FIG. 8, the systems and methods described herein are fully applicable to the other types of signals described above, as well as to signal types of such as orthogonal frequency-division multiplexing (OFDM), or orthogonal frequency-division multiple access (OFDMA), as utilized by, for example, Data Over Cable Service Interface Specification (DOCSIS) version 3.1.

In an alternative operation utilizing the measured information of plot 700 and the transformed information of response 800, a process to determine an impulse response for blocks of QAM signals (or OFDM/OFDMA, etc.) may be determined according to the following steps:

1. A block of averaged (smoothed) contiguous digital signals are selected from plot 700. Where practical, greater numbers of digital frequency samples per block may be selected to provide higher accuracy of the determination. For example, in the example shown in FIG. 7, each 7.5 MHz band may have 256 spectral components. Multiple blocks may then be "pasted" together to form a wide-band spectral response.

2. A sample of data 702 is extracted from each block/band, from the lower band edge of the lowest QAM signal, to the upper band edge of the highest QAM signal, and the sample data is converted into linear values. These values may then serve to function as the I (in-phase, or imaginary) components, as described above.

3. Use 0's for all Q (quadrature, or real) components.

4. Optionally, zero-pad additional values to fill out a 2^n IFFT transform, such as a 4096-point IFFT or a 16,384-point IFFT.

5. Optionally, apply a window to the collected data.

6. Optionally, interpolate frequency regions representing non-QAM signals, such as an analog RF carrier or a vacant band (e.g., vacant band 704), with a straight line between the channel just above the vacant band to the channel just below the vacant band.

7. Perform an IFFT on the converted linear values, including the zero-padded values, if applicable, to transform the spectral frequency data into the time domain.

8. Optionally, discard insignificant information because the transformed data will be symmetrical due to the fact that separate quadrature values were not provided (zeroed out). Additionally, a DC term will be present, as well as comb "teeth" (every 166.67 nanoseconds (ns) in the embodiment illustrated in FIG. 8) due to the notches between the 6 MHz channels illustrated.

9. Remove, by subtraction, the comb teeth. Alternately if the dropouts between channels are interpolated over, the comb teeth will disappear. As illustrated in FIG. 7, a ripple in the frequency domain will appear on plot 700 if an echo is present. Through performance of the IFFT, the ripple will linearly transform into impulse 802 located among the comb teeth, as illustrated in FIG. 8. However, where the echo is an exact multiple of 166.67 ns (the teeth spacing in the time domain), the echo is not as easily observed directly. Nevertheless, as described above with respect to FIGS. 1-4, the delay between the main impulse and the echo is the round trip time $\tau$ caused by a standing wave, corrected for velocity of propagation/velocity of the cable. Since the shape of the teeth on the comb are known, they can be removed by subtraction, and the remaining echo observed. In some embodiments, the teeth may be automatically removed through implementation of an unimpaired reference, for example, taken at an amplifier directional test point, at the launch point of the fiber node, or another location not affected by the reflected signal.

Further optional steps the process described above include, without limitation, (i) adding a correction factor to the frequency response of plot 700, depending on the percent ripple effect, to compensate for increased cable loss versus frequency, and (ii) measuring a reference signal at a node (e.g., fiber node 502, FIG. 5) to obtain a "clean copy" of the signal, which may be subsequently utilized to correct a measured test signal elsewhere along the transmission line, which may have experienced signal degradation, or slope compensation.

In one alternative embodiment, a portion of spectrum 702 is selected where the standing wave is greatest, such as the lower frequency range of plot 700. Selection of this lower frequency range may result in a larger $V_2/V_1$ ratio, and coaxial loss at relatively higher frequencies may result in a standing wave being larger at the lower frequencies. In this alternative example, by selecting only a limited portion of the spectrum, a wider impulse on the impulse response can be obtained. In other instances, larger standing waves may occur at the relatively higher frequencies.

Whether frequency response (e.g. plot 700) of the measured digital signal is deemed to include missing data, such missing data may additionally be addressed by one or more of the following ways, individually or collectively: (a) interpolated bars may be inserted between channels in order to fill in the gaps caused by channel roll-off (e.g., at 6 MHz band edges) or over missing channels; (b) an IFFT may be performed where there are noise-like signals; (c) a subtraction may be calculated for data of harmonics (H1, H2, etc.) from the time domain response information (after IFFT); and (d) where an unimpaired signal not suffering ripple is used for calibration Such calibration may include linear division in the frequency domain, or subtraction of dB values, which has a substantially same effect. The results produced therefrom can be considered valid because of the applicability of linearity to the IFFT process.

In further alternatives to the embodiments described above, an SDR be utilized over an FBC chip, or high impedance probe (e.g., test probe 102, FIG. 1) may include an amplifier or slope compensation to offset potential attenuation. In some embodiments, a general-purpose hand-held field meter is utilized to capture the magnitude only spectrum of plot 700. In other embodiments, only the OFDM portion of a downstream signal is utilized in order to reduce levels of elevated pilots.

For QAM signals in particular, the embodiments described herein are capable of achieving particular advantageous value over conventional systems or methods, because the wide bandwidth of the multiple QAM signals makes for determining significantly more accurate time resolution then can be conventionally achieved. In practical terms, this greater accuracy in the determined time resolution, allows a cable operator/repairer to locate a defect on a cable line to such accuracy that the operator need only dig a small hole to reach the buried cable for repair, as opposed to having to dig a long trench, where only a general vicinity of a defect can be determined.

Further advantages over conventional systems, which may be achieved according to the present embodiments, result from the removal of the effect of the notches between carriers, by interpolating over the notches. In some examples, the effect of the notches may be reduced by equalizing the magnitude response therefrom. In some embodiments, the systems and methods described above, as well as the alternatives thereto, may be implemented through use of analog spectrum analyzers, such as an Agilent HP8593E, that utilize a general-purpose interface bus (GPIB) to extract the magnitude data.

It can be noted that there are several variations to one basic idea described herein, namely, that of using measured magnitude data as the real part for the IFFT process, while assuming the imaginary part is always 0. One such variation, for example, reverses the implementation of the real and imaginary parts, but without significantly departing from the scope of the embodiments. For example, the measured magnitude values may be utilized as the imaginary part (I), while utilizing 0 consistently for the real part (Q). Likewise, the magnitude could be use as magnitude, and any fixed (or linearly increasing or decreasing) number used for phase angle.

Systems and methods described herein are therefore of particular use for viewing and locating a single reflection on a cable plant. Earlier proactive network maintenance (PNM) efforts were utilized to mine the upstream equalization data contained within cable modems, as an early method to predict wide problems in coaxial transmissions. The assumption was made that if an echo tunnel was present, then ripple would occur within the frequency domain, the frequency of the ripple would be an indicator of the length of the tunnel.

This earlier method, while highly valuable, had some limitations. A first limitation required at least two impedance mismatches to determine the tunnel. A second limitation occurred as a result of the narrow bandwidth of an upstream 6.4 MHz wide channel, which meant that the length of the tunnel could only be roughly approximated. A third limitation occurred as a result of the fact that an operator/technician did not know where the echo tunnel was located; only the length of the tunnel could be approximately determined, but not where the tunnel ended or began. Nevertheless, despite the fact that, like was approximation, the approximation proved of significant value the location can be determined.

The embodiments described above and throughout therefore demonstrate the development of a novel and useful testing system and test method to probe a bi-directional cable line with a high impedance probe, and then measure a voltage standing wave ratio (VSWR) on transmitted digital channels to locate a single reflection along the transmission line. As described above, a single reflection from the downstream direction creates a ripple in the frequency response, as viewed by a probe connected to a spectrum analyzer.

The embodiments described herein should be employed only with suitable test signals. In this regard, the type of test signal can be important, since TDRs, for example, cannot be utilized to measure and/or finalize signal from an in-service cable plant.

Digital downstream QAM carriers, on the other hand, may be utilized as test signals under some conditions. Referring back to FIG. 7, magnitude plot 700 of a digital downstream is captured, for example, utilizing an FBC CM chip, but may also be captured utilizing an SDR, or a conventional analog spectrum analyzer. The averaged data of plot 700 is processed as magnitude values by performance of an inverse Fourier transform (IFFT), and phase values are everywhere made zero. The data so transformed may then be viewed as frequency response 800, FIG. 8.

In practical applications, no phase data is available from a magnitude plot, and thus the embodiments herein, which determine the impulse from the magnitude-only data, are themselves performing an elegant bit of mathematics. As described above, the 6 MHz channels produce harmonics in the time domain, noted H1, H2, H3 . . . . However, a key point to the novel embodiments presented herein stems from having the ripple caused by the standing wave (labeled "wave" for purposes of this discussion). The wide bandwidth of the standing wave thereby allows for a very high precision measurement, including that of the distance of the impedance mismatch (its location) from merely knowing the location of the test probe, with the direction of the impedance mismatch assumed to originate from the downstream receiver.

The embodiments described herein significantly improve the accuracy of determining the distance along an available data transmission line based initially only measured magnitude-only values of the frequency response. The embodiments herein further allow for the advantageous determination and location of both single reflections along the transmission line, and also for echo tunnels formed along transmission lines, in some cases by interaction between two separate single reflections, or separate reflection points at varying distances from a test probe.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for testing reflections within an in-service data transmission signal, comprising:
   an operational data transmission line configured to transmit the in-service data transmission signal in a downstream direction; and
   a test probe configured to electrically contact a contact point on the operational data transmission line, and to measure a magnitude of a frequency response of the in-service data transmission signal from the operational data transmission line;
   a spectrum capturing device in operable contact with the test probe, and configured to collect and arrange data of frequency response magnitudes measured by the test probe,
   wherein the operational data transmission line includes at least a first impedance mismatch corresponding to a first reflection point along the transmission line, and
   wherein the spectrum capturing device is configured to determine a severity of the first reflection based on a comparison of a first voltage $V_1$ with a second voltage $V_2$, where $V_1$ represents a DC voltage term representing a time domain response of a main impulse of the in-service data transmission signal in the downstream direction, and where $V_2$ represents a time domain response of a subsequent reflection of the main impulse traveling in the upstream direction.

2. The system of claim 1, wherein the test probe is disposed at fiber node configured to function as a downstream launch point to make a bi-directional measurement.

3. The system of claim 1, wherein the operational data transmission line further includes at least one tap, and wherein the test probe is disposed at the at least one tap.

4. The system of claim 3, wherein the at least one tap comprises a bi-directional directional tap plate.

5. The system of claim 4, wherein the bi-directional directional tap plate includes one or more of a downstream tap port, and upstream tap port, and a bi-directional tap port.

6. The system of claim 4, wherein the bi-directional directional tap plate is configured to be removable, and implemented without interfering in the signal being transmitted over the operational data transmission line.

7. The system of claim 1, wherein the severity of the first reflection is determined according to the formula $20*\log(V1/V2)$.

8. The system of claim 1, wherein the operational data transmission line further includes at least a second impedance mismatch corresponding to a second reflection point along the transmission line, the second reflection point being different than the first reflection point along the data transmission line.

9. The system of claim 8, wherein an echo tunnel is formed along the operational data transmission line between the second impedance mismatch and the first impedance mismatch.

10. The system of claim 9, wherein the test probe is configured to tap the operational data transmission line at point upstream of the echo tunnel.

11. The system of claim 9, wherein the second reflection from the second impedance mismatch is directly observable by the test probe, and the first reflection from the first impedance mismatch is not directly observable by the test probe.

12. The system of claim 11, wherein an echo of the first reflection reflecting upstream off of the second impedance mismatch, is observable by the test probe.

* * * * *